United States Patent
Anderson et al.

(10) Patent No.: US 10,314,052 B2
(45) Date of Patent: Jun. 4, 2019

(54) SYSTEM AND METHOD FOR RECOMMENDING A CHANNEL FOR WIRELESS COMMUNICATION

(71) Applicant: AirMagnet, Inc., Santa Clara, CA (US)

(72) Inventors: John Anderson, Monument, CO (US); Matthew Gerholdt, Colorado Springs, CO (US)

(73) Assignee: AirMagnet, Inc., Santa Clara, CA (US)

( * ) Notice: Subject to any disclaimer, the term of this patent is extended or adjusted under 35 U.S.C. 154(b) by 77 days.

(21) Appl. No.: 15/647,989

(22) Filed: Jul. 12, 2017

(65) Prior Publication Data
US 2019/0021093 A1    Jan. 17, 2019

(51) Int. Cl.
| | | |
|---|---|---|
| *H04W 72/08* | (2009.01) | |
| *H04W 48/20* | (2009.01) | |
| *H04W 24/08* | (2009.01) | |
| H04W 36/16 | (2009.01) | |
| H04W 72/12 | (2009.01) | |
| H04W 72/04 | (2009.01) | |
| H04W 72/06 | (2009.01) | |
| H04W 88/08 | (2009.01) | |

(52) U.S. Cl.
CPC ......... *H04W 72/085* (2013.01); *H04W 24/08* (2013.01); *H04W 48/20* (2013.01); *H04W 36/16* (2013.01); *H04W 72/048* (2013.01); *H04W 72/06* (2013.01); *H04W 72/1226* (2013.01); *H04W 72/1231* (2013.01); *H04W 88/08* (2013.01)

(58) Field of Classification Search
None
See application file for complete search history.

(56) References Cited

U.S. PATENT DOCUMENTS

| 7,768,960 | B1* | 8/2010 | Barratt | H04W 48/16 370/328 |
|---|---|---|---|---|
| 8,041,319 | B2* | 10/2011 | He | H04W 48/16 370/323 |
| 8,625,441 | B2 | 1/2014 | Hittel et al. | |
| 2006/0142004 | A1* | 6/2006 | He | H04W 48/16 455/434 |
| 2009/0130977 | A1* | 5/2009 | Grushkevich | H04W 72/082 455/41.2 |
| 2011/0103242 | A1* | 5/2011 | Hittel | H04W 24/08 370/252 |
| 2012/0094692 | A1* | 4/2012 | MacDonald | G01S 5/0252 455/456.1 |

(Continued)

OTHER PUBLICATIONS

NetSpot web page; Your Wi-Fi survey app for Mac and Windows; https://www.netspotapp.com/features.html.

*Primary Examiner* — Bunjob Jaroenchonwanit
(74) *Attorney, Agent, or Firm* — Locke Lord LLP; Scott D. Wofsy; Christopher J. Capelli

(57) ABSTRACT

A system and computer-implemented method is provided. The method includes receiving measurements obtained at a plurality of locations of a user site and associated with wireless communication quality of multiple channels at the respective locations, determining a channel-location score for each channel for each of the locations based on the measurements obtained for that location, and generating an overall channel score for each channel based on the channel-location scores determined for the channel at each of the locations.

16 Claims, 6 Drawing Sheets

(56) References Cited

U.S. PATENT DOCUMENTS

| | | | |
|---|---|---|---|
| 2013/0085803 A1* | 4/2013 | Mauro | G06F 7/02 |
| | | | 705/7.29 |
| 2014/0126514 A1* | 5/2014 | Tang | H04W 24/02 |
| | | | 370/329 |
| 2014/0365335 A1* | 12/2014 | Tyshuk | G06Q 30/0623 |
| | | | 705/26.61 |
| 2014/0366142 A1* | 12/2014 | Jeon | H04L 63/1433 |
| | | | 726/25 |
| 2015/0188662 A1* | 7/2015 | Shapira | H04K 3/825 |
| | | | 455/1 |

* cited by examiner

SYSTEM AND METHOD FOR RECOMMENDING A CHANNEL FOR WIRELESS COMMUNICATION

FIELD OF THE INVENTION

The present technology relates to wireless communication and, more particularly, methods and systems to recommend a channel to use for wireless communication.

BACKGROUND OF THE INVENTION

When configuring a router or access point for wireless communication, a channel is selected to use for transmitting and receiving data. Availability of channels can vary with geographical location of router or access point and the band chosen for wireless frequency. For example, when using wireless communication technology based on IEEE 802.11 (Wi-Fi) in the 2.4G band in the United States, there are 11 channels available, whereas when using Wi-Fi technology in the 5G band in the United States, 25 channels are available. Conventionally, a channel is selected as a default setting on the access point or router or by performing an analysis of the wireless quality of the available channels at the location of the access point or router at a particular time. However when selecting the channel based on wireless quality at the location of the access point or router does not account for devices that use Wi-Fi services at locations different than that of the access point. In view of the proliferation of the use of mobile devices, as well as their mobility, Wi-Fi services may be used by different or the same mobile device at multiple locations.

Additionally, there are different measurements of various characteristics of the wireless quality that can contribute to optimal channel selection and affect user quality of experience (QoE). A technician typically does not have the training to use of all these factors to make a recommendation for the channel to use.

In addition, the wireless quality changes over time. Even when a technician is summoned to monitor wireless quality for selection of the best channel, the technician only monitors the wireless quality at the time of his visit, typically at the location of the access point or router. Such conventional methods and systems have generally been considered satisfactory for their intended purpose. However, there is still a need in the art for recommendation of a channel for wireless communication that can be used by a layman and accounts for mobile devices that use Wi-Fi services at multiple locations different from the location of the access point or router, different characteristics of the wireless quality, and, changes in wireless quality over time.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, disclosed is a computer-implemented method that includes receiving measurements obtained at a plurality of locations of a user site and associated with wireless communication quality of multiple channels at the respective locations, determining a channel-location score for each channel for each of the locations based on the measurements obtained for that location, and generating an overall channel score for each channel based on the channel-location scores determined for the channel at each of the locations. In accordance with another aspect of the disclosure, a test tool is provided that includes a memory configured to store instructions and a processor disposed in communication with the memory, wherein the processor upon execution of the instructions is configured to perform the operations of the method.

In accordance with still another aspect of the disclosure, a non-transitory computer readable storage medium and one or more computer programs stored therein are provided. The computer programs include instructions, which when executed by a computer system, cause the computer system to perform the operations of the method.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
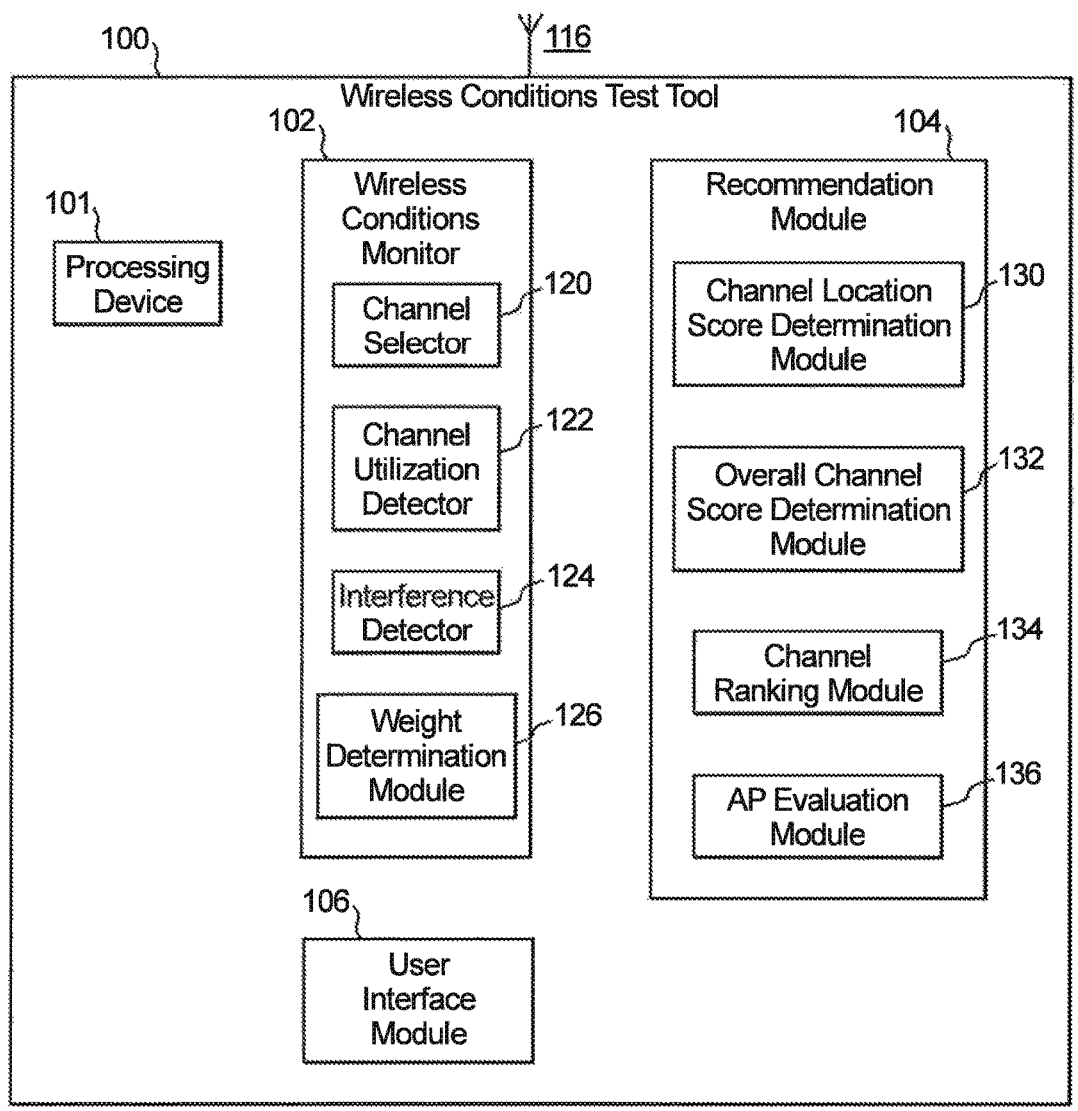
FIG. 1 illustrates an example wireless conditions test tool in accordance with embodiments of the disclosure.

Reference will now be made to the drawings wherein like reference numerals identify similar structural features or aspects of the subject disclosure. For purposes of explanation and illustration, and not limitation, a block diagram of an exemplary embodiment of a wireless quality test tool in accordance with the disclosure is shown in FIG. 1 and is designated generally by reference character 100. Other embodiments of the test tool 100 in accordance with the disclosure, or aspects thereof, are provided in FIGS. 2-6, as will be described.

The test tool 100 can monitor channels, including measuring wireless quality at different times over a period of time, and use these measurements to recommend a channel to use for wireless communications, e.g., Wi-Fi using IEEE 802.11. The channel recommendation can be displayed to a user and/or used to control channel selection of a device, such as a router or access point. The test tool 100 can further monitor the channels by measuring wireless quality at different locations of a physical environment that use wireless communication serviced by a router or access point, and use these measurements to recommend a channel to use for wireless communications, e.g., Wi-Fi.

A user can prioritize the physical locations, and this prioritization can be used to weight the measurements obtained for the different physical locations. In addition, the test tool 100 can monitor channels by measuring different characteristics of wireless quality at each of the different locations, and use these measurements to recommend a channel to use for wireless communications, e.g., Wi-Fi. The recommendation for a channel can thus be based on measurements taken over time, measurements obtained at different physical locations (which can be optionally weighted), and/or measurements of different characteristics of wireless quality. The test tool user can be a technician or layman that operates the test tool to take measurements at the different locations and requests channel selection recommendation.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth. It is to be appreciated the embodiments of this disclosure as discussed below are implemented using a software algorithm, program, or code that can reside on a computer useable medium for enabling execution on a machine having a computer processor. The machine can include memory storage configured to provide output from execution of the computer algorithm or program.

As used herein, the term "software" is meant to be synonymous with any logic, code, or program that can be executed by a processor of a host computer, regardless of whether the implementation is in hardware, firmware or as a software computer product available on a disc, a memory storage device, or for download from a remote machine. The embodiments described herein include such software to implement the equations, relationships, and algorithms described above. One skilled in the art will appreciate further features and advantages of the disclosure based on the above-described embodiments. Accordingly, the disclosure is not to be limited by what has been particularly shown and described, except as indicated by the appended claims.

Description of certain illustrated embodiments of the present disclosure will now be provided. With reference now to FIG. 1, test tool 100 includes a processing device 101, a wireless conditions monitor 102, a recommendation module 104, a user interface module 106, and an antenna 116. The processing device 101 can include one or more control devices, microprocessors, field-programmable gate arrays (FPGA), and/or application specific integrated circuits (ASIC). The wireless test tool 100 can be embodied as a hand held tool that can be relocated to different locations to monitor the wireless conditions by obtaining measurements at each of the locations. Alternatively, multiple wireless condition monitors 102 can be provided in a plurality of stationary devices stationed at different locations to monitor the wireless conditions at their respective locations. The recommendation module 104 uses measurements obtained at the different locations to recommend a channel to be selected. The recommendation can include outputting to a user or a processor identification of the channel recommended to be selected.

The processing device 101 can be caused to perform operations when executing the recommendation module 104 and the user interface module 106. These operations can include receiving input data from a user, outputting data to the user, controlling the wireless conditions monitor 102 and/or receiving and processing data from the wireless conditions monitor 102. At least a portion of the processing device 101 can be remote from the wireless conditions monitor. One or more portions of the processing device 101, the wireless conditions monitor 102, the recommendation module 104 and/or the user interface module 106 can be housed in different housings that can be adjacent to or remote from one another, with communication provided by the processing device 101 between the portions housed in the different housings. The wireless conditions monitor 102 is in communication with the antenna 116 for controlling and receiving information from the antenna 116.

The wireless conditions monitor 102, recommendation module 104, and user interface module 106 can be combined into one module, and/or can include one or more modules. Additionally, the wireless conditions monitor 102, recommendation module 104, and user interface module 106 can share components.

The wireless conditions monitor 102 includes a channel selector 120, a channel utilization detector 122, an interference detector 124, and a weight determination module 126. The channels that can be monitored are included in, but are not limited to, the 2.4 GHz and the 5 GHz spectral bands. For each of the wireless channels of a particular band or bands, the instrument can provide an indication of the presence of: signals that follow a particular protocol, such as but not limited to the IEEE 802.11 protocol, signals that do not follow the particular protocol (e.g., but not limited to non-IEEE 802.11 protocol signals (e.g., Bluetooth devices, microwave ovens, cordless telephones, video phones, wireless cameras, and noise that are present within the band(s))), and the number of routers or access points (APs) that are operating on each channel. Unless indicated otherwise, routers and APs are referred to collectively as APs for brevity.

The channel selector 120 provides for selection of a band (e.g., 2.4 GHz or 5 GHz) in response to input from a user or a processing module, or default to a particular band. Once a band is selected, the channel selector 120 provides for selection of each of the channels for monitoring purposes in response to input from a user or a processing module. For example, the channel selector 120 can automatically (or manually be caused to) sequentially select each of the channels for monitoring, wherein the monitoring can include requesting performance of a test by the wireless chipset for the selected channel to obtain measurements. The channel selector 120 can treat the available channels as a series of channels, and iteratively select (e.g., automatically), for the series of channels, a next channel to be monitored. The test performance can be performed by the channel utilization detector 122 and the interference detector 124.

The channel wireless conditions monitor 102 can be implemented using a wireless chipset, such as, but without limitation, the 9000 series chip set manufactured by Qualcomm® Atheros® Inc., without limitation to a particular chipset. Each of the channel selector 120, the channel utilization detector 122, and the interference detector 124 includes software, hardware, and/or firmware to perform its functions. The channel selector 120, the channel utilization detector 122, and the interference detector 124 can share software, hardware, and/or firmware components. Additionally, each of the channel selector 120, the channel utilization detector 122, and the interference detector 124 can interact with the wireless chipset, such as to select the channel to be monitored and to receive information indicative of utilization and interference. U.S. Pat. No. 8,625,441 to Hittel et al., and assigned to Fluke® Corporation describes an example of an instrument that includes circuitry to scan and monitor the wireless communication channels for utilization and interference, and to select the channels to scan and monitor, and is incorporated herein by reference in its entirety.

Once a channel is selected, the channel utilization detector 122 and the interference detector 124 each perform test performance tasks to monitor the selected channel. For example, the channel utilization detector 122 performs test performance tasks that can include measuring 802.11 utilization for that channel, meaning measuring utilization of the channel that follows the IEEE 802.11 protocol(s) and/or detecting and measuring non-802.11 utilization, meaning measuring utilization of the channel that does not follow the IEEE 802.11 protocol(s).

Regarding the interference detector 124, it performs test performance tasks that can include classifying the source of interference associated with non-802.11 utilization as a specific type of device, e.g., a wireless camera, a microwave oven, a wireless baby monitor, etc., measuring co-channel interference, and measuring adjacent channel interference, Co-channel interference refers to an overlap of signal coverage on the same channel by more than one AP. Adjacent channel interference refers to an overlap in spectrum width of one or more APs that are operating on different channels at 2.4 GHz, wherein a signal from one of the APs can still interfere with a signal from another AP. For example, an AP operating on channel 3 may interfere with an AP operating on channel 1, since channel 3 spectrum overlaps with channel 1 spectrum.

The interference detector 124 can use a circuit, such as the 9000 series chipset manufactured by the Atheros Communications of Santa Clara, Calif., without limitation to a particular chipset, to scan and monitor the selected channels. The channels can be scanned using a scanning algorithm that can incorporate different length measurement period.

The weight determination module 126 applies weights to the measurements obtained by the channel utilization detector 122 and the interference detector 124. The values of the weights applied can be based on empirical testing and best practices. For example, since adjacent channel interference can affect quality more than co-channel interference, adjacent channel interference can be weighted higher than co-channel interference for determination of a channel-location score. In an example of best practice, when using 2.4 GHz, operation is refrained from in channels other than channels 1, 6, and 11. Accordingly, these channels can be weighted to produce a poor channel-location score or excluded altogether when calculating the channel-location score.

The recommendation module 104 includes a channel-location score determination module 130, an overall channel score determination module 132, a channel ranking module 134, and optionally an access point (AP) evaluation module 136. The recommendation module 104 can be stored by a memory device of the wireless conditions test tool 100 and executed by the processing device 101 to cause the processing device 101 to perform functions in accordance with the present disclosure. One or more portions of the channel-location score determination module 130, overall channel score determination module 132, channel ranking module 134, and/or AP evaluation module 136 can be combined or shared. The channel-location score determination module 130 calculates, for each channel that has been selected, at each location monitored, a channel-location score that uses measurements obtained from the channel utilization detector 122 and the interference detector 124, optionally applying weights determined by the weight determination module 126. The channel-location score determination module 130 can normalize the measurements obtained by the channel utilization detector 122 and the interference detector 124, apply the weights determined by the weight determination module 126 as coefficients, and sum the results to obtain a weighted channel-location score for each channel at a location monitored. The overall channel score determination module 132 determines a channel score for each channel using the channel-location scores obtained at each of the locations monitored by the channel-location score determination module 130. The channel-location scores can be weighted based on the user's prioritization of the corresponding locations. The user's prioritization can be entered by the user, such as by sorting the locations into a prioritized list, e.g., with the first location of the prioritized list having the highest priority. The channel score can be obtained by summing, for each channel, the weighted channel-location scores calculated for each location at which the channel was monitored.

The channel ranking module 134 compares the channel scores for all of the available channels and selects the channel that has the optimal (e.g., highest) channel score. Selection of the channel can include outputting the selection as a recommendation to the user via the user interface device 106 or controlling the channel selector 120 to use the selected channel.

The channel ranking module 134 can exclude from the ranking, or weight for a very low ranking, those channels in which an interference source was detected and/or classified by the interference detector 124. The weighting of the channels can be determined, for example, when an interference source detected is associated with non-802.11 utilization and classified as a specific type of device, e.g., a wireless camera, a microwave oven, a wireless baby monitor, etc.

The ranking and selection of the channels by the channel ranking module 134 can be determined, for example, based on governance rules at the geographic location, channel availability at the geographic location using the band selected, channel configuration constraints, and industry best practices. For example, since certain channels may be restricted at certain geographic locations, such as based on availability and/or governing regulations at the particular geographic locations and/or the band currently selected. Governance rules can govern which band or channels are permitted to be ranked or recommended for selection. Examples of governance rules include when the 2.4 GHz spectrum is selected, do not select a 40 MHz channel for test performance. An example of best practice is to only use channels 1, 6, and 11 in the 2.4 GHz spectrum band.

An AP evaluation module 136 can be provided, e.g., with the wireless conditions monitor 102, that uses the channel-location scores and/or the channel scores to evaluate for a selected AP whether a particular channel, such as the channel being used, is adequate at all measured locations. The AP evaluation module 136 compares the channel recommended by the channel ranking module 134 with the channel that the AP selected. If the channel selected by the channel ranking module 134 is different than the channel selected by the AP, the AP evaluation module 136 outputs, such as for display, a list or graphical display of locations that have poor performance for the AP selected channel based on a comparison of channel-location scores for the channel recommended by the channel ranking module 134 and channel-location scores for the channel selected by the AP.

The user interface module 106 interfaces with a user to receive the user's prioritization of different locations relative to one another, wherein wireless environment measurements are obtained from the different locations. The wireless environment measurements can be measurements of radio frequency conditions. The user interface module 106 can also output to the user a channel that has been recommended. The UI module 106 can interface with one or more user input devices, such as a keypad, pointing device (e.g., thumb pad), touch screen, etc. for obtaining the user input data, such as the user's prioritization of the different locations. The user-entered prioritizations can be provided to the overall channel score determination module 132, which can assign a priority value to each of the locations based on the user-entered prioritizations or default values if the user did not enter a prioritization of the locations. The UI module 106 can further interface with user output devices, such as a display monitor, audio speakers, and/or a printer to output data to the user. Thus, the UI module 106 provides an interface for exchanging data between a user and the recommendation module 104.

Figure 2:
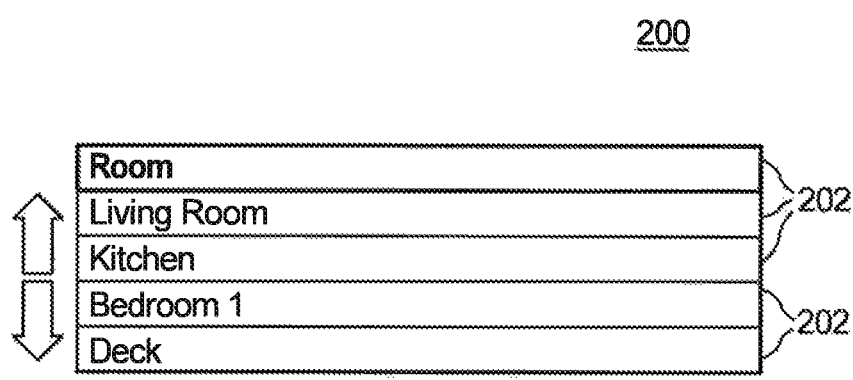
FIG. 2 illustrates an example screenshot displayed by a graphical user interface of a test tool in accordance with embodiments of the disclosure.

FIG. 2 shows a screenshot 200 of a graphical user interface (GUI) of the test tool 100. The screenshot 200 displays a sortable list of interactive graphical elements 202 associated with locations (e.g., rooms), with the interactive graphical element corresponding to the location having the highest priority positioned at the top of the list. The user may be, for example, a network technician that operates the user-input device on the test tool 100 to enter prioritization of the locations. In embodiments, a default sorted list is initially displayed of interactive graphical elements 202 corresponding to the locations based on a default prioritization.

Each location can represent a different room in one or more buildings. The user can operate the user-input device to assign a prioritization to the locations, such as by re-sorting, e.g., by clicking and dragging, the interactive graphical elements 202 that correspond to the different locations. Re-sorting the list can include assigning each location a different priority, or assigning two or more locations the same priority. If the user does not re-sort the original sorted list, a default sorted list of the locations is used by the overall channel score determination module 132 to determine prioritization of the different locations. Once the user operates the user-input device to sort the locations into a user-prioritized order. The user can submit the prioritization indicated by the sorted list. The overall channel score determination module 132 receives the submitted prioritization and assigns a priority value to each location based on its position in the sorted list. Alternatively, the user can directly assign priority values to the respective locations.

Figure 3:
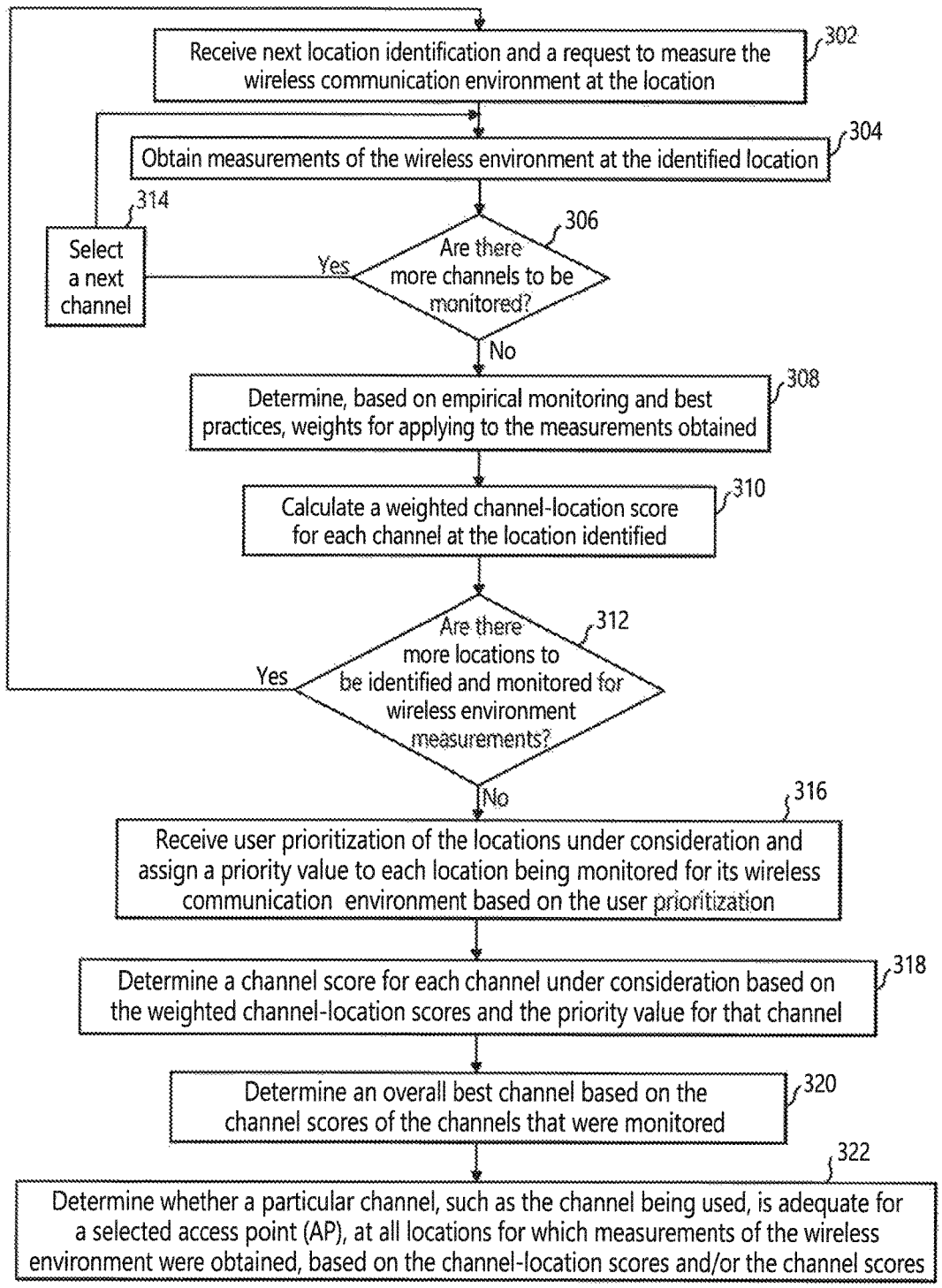
FIGS. 3-5 illustrate flowcharts showing respective example methods performed by a test tool in accordance with embodiments of the disclosure.
Figure 4:
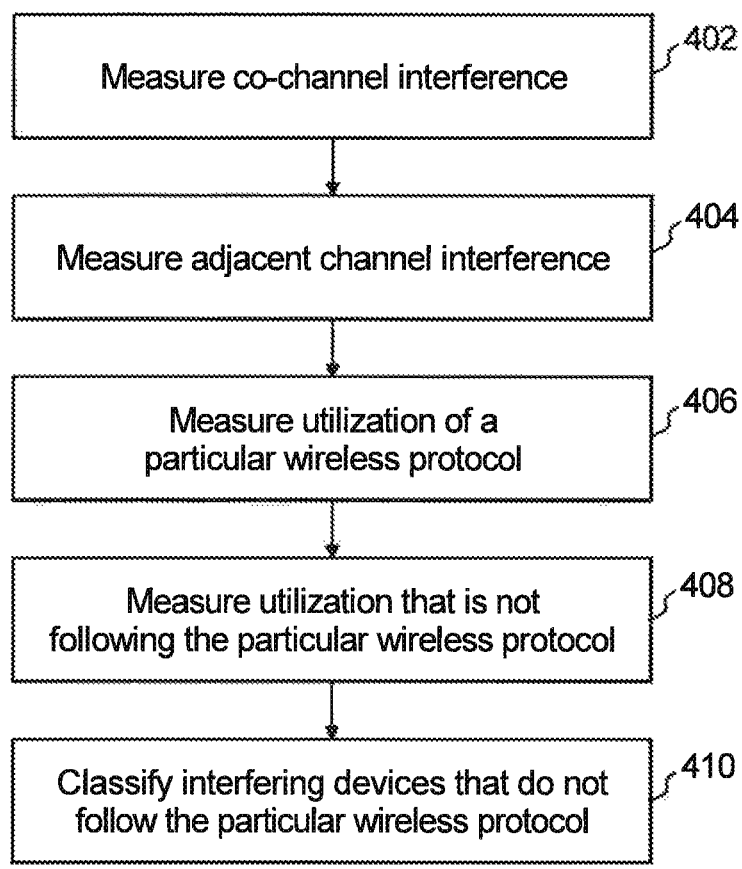
Figure 5:
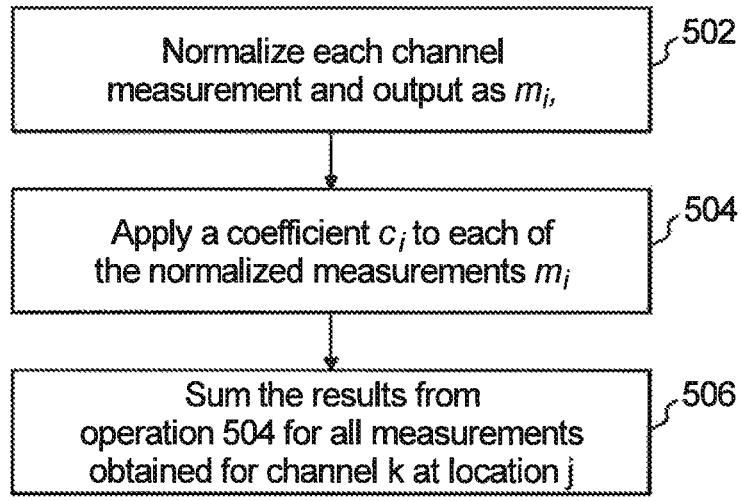

With reference now to FIGS. 3-5, shown are flowcharts demonstrating implementation of the various exemplary embodiments. It is noted that the order of operations shown in FIGS. 3-5 is not required, so in principle, the various operations may be performed out of the illustrated order or in parallel. Also certain operations may be skipped, different operations may be added or substituted, or selected operations or groups of operations may be performed in a separate application following the embodiments described herein.

With reference to FIG. 3, a method performed by a test tool, such as test tool 100 shown in FIG. 1, is shown for recommending a channel to use for wireless communication. At operation 302, location (e.g., room) identification and a request to measure the wireless communication environment in the location room is received. The term "receive" herein refers to get, read, be given, copy, retrieve, or otherwise obtain data. Operation 302 can include waiting for the location identification and request. At operation 304, measurements are obtained of the wireless environment in the identified location. Measurements of the wireless environment can include measurements of each channel under consideration for wireless communication. The measurements can measure utilization of each channel that follows a communication protocol, such as the 802.11 protocols, measurements of utilization of each channel that do not follow the communication protocol, measurements of co-channel interference associated with each channel, measurements of adjacent channel interference associated with each channel. In addition to measuring the utilization of each channel that does not follow the communication protocol, devices that are utilizing the channel and causing interference are classified.

At operation 306, a determination is made whether there are more channels to be monitored. The determination can be made based on knowledge of the channels that are to be monitored, such as based on the channels that are available. If the determination at operation 306 is YES, the method continues at operation 314 in which a next channel is selected for monitoring, after which the method continues at operation 304, else if the determination at operation 306 is NO, the method continues at operation 308.

At operation 308, weights for applying to the measurements obtained at operation 304 are determined based on empirical testing and best practices. At operation 310, a weighted channel-location score is calculated for each channel at the location identified using the measurements obtained for the location at operation 304 and the weights determined at operation 308.

At operation 312, a determination is made whether there are more locations to be identified and monitored for wireless environment measurements. The determination can be made based on user input or a timeout condition (e.g., no user input was received for a predetermined time period) that indicates no further locations are to be monitored. For example, the user can operate a user input device that communicates with a user interface module (such as user interface module 106 shown in FIG. 1) to indicate whether additional locations are to be monitored. If the determination at operation 312 is YES, the method continues at operation 302, else if the determination at operation 312 is NO, the method continues at operation 316.

At operation 316, user prioritization of the locations is received and a priority value is assigned to each location based on the user prioritization, or a default prioritization if a user prioritization is not received. The user prioritization can be a sorted list of the locations being monitored for wireless environment measurements. It is noted that the user prioritization can be received at any point before operation 316. At operation 318, a channel score is determined for each channel under consideration based on the weighted channel-location scores determined at operation 308 for that channel and the priority value assigned to that channel at operation 316. An example equation for calculating the channel score for a channel k, for all of the locations at which measurements were taken, is shown in Equation (1):

$$s_k = \sum_{j=1}^{m} d_j(r_j)$$

wherein $r_j$ are the measurement results that were previously calculated, $d_j$ is a priority value that corresponds to the location, m is the number of locations at which measurements were obtained, and $s_k$ is the channel score for channel k.

At operation 320, an overall best channel is determined based on the channel scores determined at operation 318. For example, the channel having the maximum value for $s_k$ determined at operation 318 is selected. The selection can be displayed to a user as a recommendation or can be used to control channel selection of a device, such as an AP.

At optional operation 322, a determination is made whether a particular channel, such as the channel being used, is adequate at all measured locations for a selected AP based on the channel-location scores and/or the channel scores. Operation 322 can be performed to help a technician decide whether to change the channel based on the channel recommendation generated at operation 320. If the AP's current channel is different than the recommended channel, a comparison of channel-location scores associated with the recommended channel relative to the current channel being used by the AP can be presented. Accordingly, the technician can decide if the comparison indicates there is a margin of improvement that warrants changing the current channel being used by the AP to the recommended channel. In embodiments, operations 302-312 can be repeated at different times to incorporate dynamic wireless conditions monitored at different times into the channel-location score for each channel. The weighted channel-location scores for each channel that correspond to measurements obtained at different times can be combined, e.g., by selecting a worst score, summing, or averaging, to obtain a dynamic weighted channel-location score for the channel. The dynamic weighted channel-location score accounts for changes in wireless conditions that occur over time. The channel score determined for each channel at operation 318 can use the corresponding dynamic weighted channel-location scores.

With reference to FIG. 4, a method performed by a test tool, such as test tool 100 shown in FIG. 1, is shown for obtaining measurements of the wireless environment in the identified location, such as performed at operation 304 of FIG. 3. At operation 402, co-channel interference is measured. At operation 404, adjacent channel interference is measured. Operation 404 is performed once per location after scanning all channels in a band to detect APs operating on other channels. For each channel, APs determined to be operating on an overlapping channel are deemed to be ACI for that channel. At operation 406, a particular wireless protocol utilization, such as but not limited to 802.11, is measured. At operation 408, utilization that is not following the particular wireless protocol is measured, which, when the particular wireless protocol is 802.11, is also referred to as non 802.11 utilization. At operation 410, interferers that do not follow the particular wireless protocol and cause the non-802.11 utilization measured in operation 408 are detected and classified. Non-802.11 utilization measured in operation 408 may be caused by other sources than what are detected and classified in operation 410, such as high general channel noise or a signal source that cannot be classified.

With reference to FIG. 5, a method performed by a test tool, such as test tool 100 shown in FIG. 1, for performing operation 308 shown in FIG. 3 in which the overall channel score for a selected channel k at a selected location j is calculated. At operation 502, each channel measurement is normalized and output as $m_i$, wherein $m_i$, is the normalized measurement results for the ith measurement. For example the channel measurements are normalized to the range [0,10], with 10 being the best case. At operation 504, a coefficient $c_i$, is applied to each of the normalized measurements $m_i$. At operation 506, the normalized results are summed with the corresponding coefficients and weights applied, the weights being determined at operation 306. An example equation for summing the results at operation 506 is shown in Equation (2):

$$r_{j,k} = \Sigma_{i=1}^{n} c_i(m_i)$$

wherein n is the number of measurements, and r is the summed results for channel k measured at location j.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of a computer system 602 of the test tool 100 may be implemented or executed by one or more computer systems. For example, the processing device 101 and modules executed by the processing device 101 (e.g., the recommendation module 104 and the user interface module 106) can be implemented using a computer system such as example computer system 602 illustrated in FIG. 6. In various embodiments, computer system 602 may be included in a plurality of stationary devices (e.g., a desktop computer or computer station) stationed at different locations or a mobile device that can be moved from location to location, such as a laptop, tablet, smart phone, handheld tool or the like. The computer system 602 can include one or more of a field-programmable gate array (FPGA), application specific integrated circuit (ASIC), microcontroller, microprocessor, or the like.

Computer system 602 is only one example of a suitable system and is not intended to suggest any limitation as to the scope of use or functionality of embodiments of the disclosure described herein. Regardless, computer system 602 is capable of being implemented and/or performing any of the functionality set forth hereinabove.

Computer system 602 may be described in the general context of computer system-executable instructions, such as program modules, being executed by a computer system. Generally, program modules may include routines, programs, objects, components, logic, data structures, and so on that perform particular tasks or implement particular abstract data types. Computer system 602 may be practiced in distributed data processing environments where tasks are performed by remote processing devices that are linked through a communications network. In a distributed data processing environment, program modules may be located in both local and remote computer system storage media including memory storage devices.

Figure 6:
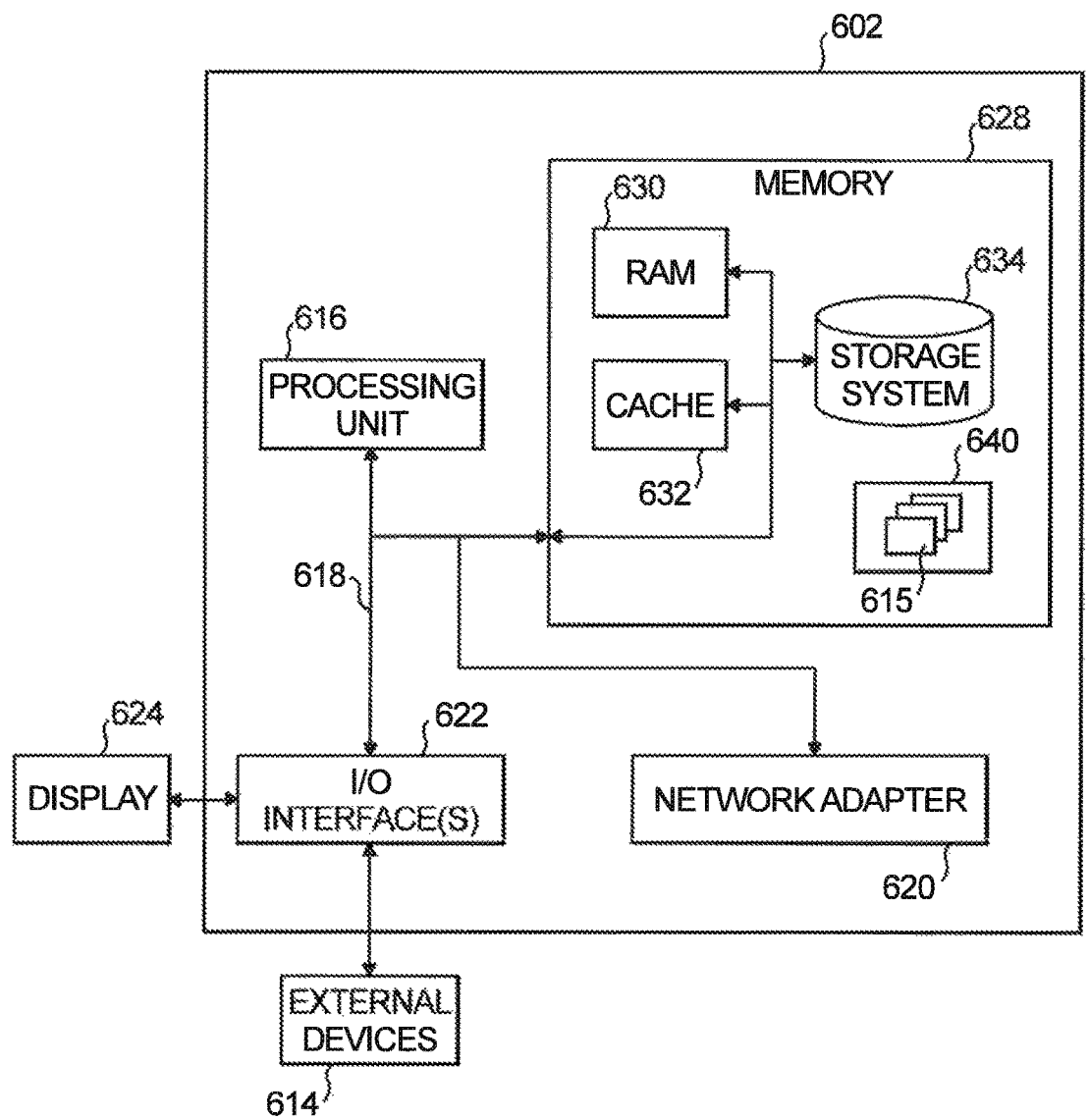
FIG. 6 illustrates a schematic block diagram of an example computer system of a test tool, in accordance with an illustrative embodiment of the present disclosure.

Computer system 602 is shown in FIG. 6 in the form of a general-purpose computing device. The components of computer system 602 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 602 typically includes a variety of computer system readable media. Such media may be any available media that is accessible by the processing device 101, and it includes both volatile and non-volatile media, removable and non-removable media.

System memory 628 can include computer system readable media in the form of volatile memory, such as random access memory (RAM) 630 and/or cache memory 632. Computer system 602 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the disclosure.

Program/utility 640, having a set (at least one) of program modules 615, such as the recommendation module 104 and the user interface module 106, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 615 generally carry out the functions and/or methodologies of embodiments of the disclosure as described herein.

Computer system 602 may also communicate with one or more external devices 614 such as a keypad, touchscreen, keyboard, a pointing device, a display 624, etc.; one or more devices that enable a user to interact with computer system 602; and/or any devices (e.g., network card, modem, etc.) that test tool 100 to communicate with one or more other computing devices. Such communication can occur via Input/Output (I/O) interfaces 622. Still yet, computer system 602 can communicate with one or more networks such as a local area network (LAN), a general wide area network (WAN), and/or a public network (e.g., the Internet) via network adapter 620. As depicted, network adapter 620 communicates with the other components of the packet analysis system 62 via bus 618. It should be understood that although not shown, other hardware and/or software components could be used in conjunction with computer system 602. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Potential advantages provided by the disclosed method include the ability to monitor wireless conditions by a layman by activing the test tool 100 in a plurality of different locations and recommending a channel to select that would operate optimally based on the wireless conditions. Since wireless conditions are dynamic over time, a layman can monitor the wireless conditions at multiple different times, and the monitoring tests performed at the different times can be used to select the channel. The layman nearly needs to station the test tool 100 (e.g., by moving the mobile test tool 100 to the location or selecting a wireless conditions monitor 102 stationed at the location), identify the location, and request performance of the wireless conditions monitoring. The layman can repeat these tasks for each location being monitored.

The layman can optionally operate the test tool 100 to monitor these locations at different times. The test tool 100 can recommend a channel that operates optimally based on the monitored wireless conditions and display the selection to the user and/or control selection of the channel by a device, such as an AP. Accordingly, the layman does not need to be informed about or understand the implications of channel utilization or interference for selection of the channel.

The techniques described herein are exemplary, and should not be construed as implying any particular limitation of the certain illustrated embodiments. It should be understood that various alternatives, combinations, and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

The terms "comprises" or "comprising" are to be interpreted as specifying the presence of the stated features, integers, operations or components, but not precluding the presence of one or more other features, integers, operations or components or groups thereof.

Although the systems and methods of the subject disclosure have been described with respect to the embodiments disclosed above, those skilled in the art will readily appreciate that changes and modifications may be made thereto without departing from the spirit and scope of the certain illustrated embodiments as defined by the appended claims.

The invention claimed is:

1. A computer-implemented method of:
receiving measurements obtained at a plurality of locations of a user site and associated with wireless communication quality of multiple channels at the respective locations;
determining a channel-location score for each channel for each of the locations based on the measurements obtained for that location;
generating an overall channel score for each channel based on the channel-location scores determined for the channel at each of the locations; and
receiving user input data indicating a prioritization of the respective locations, wherein the overall channel score for each channel is further based on the prioritization indicated by the user input data; and
providing a graphical user interface (GUI) that displays an editable sorted location list of the plurality of locations in a first order, wherein the user input data is based on the list of the plurality of locations provided in a second order input to the GUI by the user.

2. The method of claim 1, further comprising:
measuring, at the plurality of locations for the respective channels, radio frequency conditions; and
outputting the measurements of radio frequency conditions.

3. The method of claim 2, wherein the radio frequency conditions measured include at least channel utilization affecting the respective channels.

4. The method of claim 3, wherein measuring the channel utilization includes at least one of measuring non-802.11 utilization of a channel and 802.11 utilization.

5. The method of claim 3, wherein the radio frequency conditions measured further include interference including at least one of co-channel interference, adjacent channel interference, and non-802.11 interference.

6. The method of claim 5, wherein the non-802.11 interference is classified as a specific type of device, and the channel score is adjusted in accordance with an expected impact of that type of device.

7. The method of claim 2, further comprising:
providing a graphical user interface (GUI) that prompts the user to enter a name for each location at which the measurements are measured; and
associating measurements measured at each location with the name entered for the location.

8. The method of claim 1, wherein the overall channel score for each channel is further based on at least one of channel availability, channel configuration constraints, and generally accepted best practices that affect the channel.

9. The method of claim 1, further comprising:
ranking the overall channel scores in a ranked order based on the values of the respective overall channel scores; and
displaying the overall channel scores in the ranked order.

10. The method of claim 1, further comprising:
comparing the overall channel scores of the respective channels; and
recommending a channel to select based on the comparison.

11. The method of claim 1, further comprising:
receiving at different times the measurements obtained at each of the plurality of locations of the user site and associated with wireless communication quality of the multiple channels at the respective locations; and
determining a channel-location score for each channel for each of the locations based on the measurements obtained for that location at the different times.

12. A test tool comprising:
a memory configured to store instructions;
a processor disposed in communication with the memory, wherein the processor upon execution of the instructions is configured to:
receive measurements obtained at a plurality of locations of a user site and associated with wireless communication quality of multiple channels at the respective locations;
determine a channel-location score for each channel for each of the locations based on the measurements obtained for that location;
generate an overall channel score for each channel based on the channel-location scores determined for the channel at each of the locations;
receive user input data indicating a prioritization of the respective locations, wherein the overall channel score for each channel is further based on the prioritization indicated by the user input data; and
provide a graphical user interface (GUI) that displays an editable sorted location list of the plurality of locations provided in a first order, wherein the user input data is based on the list of the plurality of locations provided in a second order input to the GUI by the user.

13. The test tool of claim 12, further comprising circuitry for measuring at the plurality of locations, for the respective channels, radio frequency conditions, including at least one of channel utilization, wherein the channel utilization measured includes at least one of 802.11 utilization and non-802.11 utilization.

14. The test tool of claim 12, further comprising circuitry for measuring at the plurality of locations, for the respective channels, radio frequency conditions, including at least interference affecting the respective channels, wherein the interference measured includes at least one of co-channel interference, adjacent channel interference, and non-802.11 interference and outputting the measurements of radio frequency conditions.

15. The test tool of claim 14, wherein the processor, upon execution of the instructions, further classifies the non-802.11 interference as a specific type of device, and the channel score is adjusted in accordance with an expected impact of that type of device.

16. The test tool of claim 12, wherein the processor, upon execution of the instructions, is further configured to:
   compare the overall channel scores of the respective channels; and
   recommend a channel to select based on the comparison.

* * * * *